US 8,218,617 B2

(12) United States Patent
Kim et al.

(10) Patent No.: US 8,218,617 B2
(45) Date of Patent: *Jul. 10, 2012

(54) METHOD AND SYSTEM FOR OPTIMAL VIDEO TRANSCODING BASED ON UTILITY FUNCTION DESCRIPTORS

(75) Inventors: Jae-Gon Kim, Daejeon (KR); Yong Wang, Beijing (CN); Shih-Fu Chang, New York, NY (US); Kyeongok Kang, Daejeon (KR); Jinwoong Kim, Daejeon (KR)

(73) Assignee: The Trustees of Columbia University in the City of New York, New York, NY (US)

( * ) Notice: Subject to any disclaimer, the term of this patent is extended or adjusted under 35 U.S.C. 154(b) by 2358 days.

This patent is subject to a terminal disclaimer.

(21) Appl. No.: 10/965,040

(22) Filed: Oct. 14, 2004

(65) Prior Publication Data

US 2009/0290635 A1 Nov. 26, 2009

Related U.S. Application Data

(63) Continuation of application No. PCT/US03/12858, filed on Apr. 25, 2003.

(60) Provisional application No. 60/376,129, filed on Apr. 26, 2002, provisional application No. 60/384,939, filed on May 31, 2002.

(51) Int. Cl.
*H04N 7/12* (2006.01)
*H04N 11/02* (2006.01)
*H04N 11/04* (2006.01)
(52) U.S. Cl. .................................. 375/240.01
(58) Field of Classification Search .......... None
See application file for complete search history.

(56) References Cited

U.S. PATENT DOCUMENTS

| 5,694,334 | A | 12/1997 | Donahue et al. ............. 364/514 |
| 6,339,450 | B1 * | 1/2002 | Chang et al. .................. 348/470 |
| 6,356,309 | B1 | 3/2002 | Masaki et al. ................ 348/439 |
| 6,366,314 | B1 | 4/2002 | Goudezeune et al. ........ 348/192 |
| 6,526,099 | B1 * | 2/2003 | Christopoulos et al. . 375/240.26 |
| 6,700,935 | B2 * | 3/2004 | Lee .......................... 375/240.16 |
| 7,145,946 | B2 * | 12/2006 | Lee ................................. 375/240 |

(Continued)

FOREIGN PATENT DOCUMENTS

JP  1996317384  11/1996

OTHER PUBLICATIONS

Sun, et al., "Architectures for MPEG Compressed Bitstream Scaling." Transactions on Circuits and Systems for Video Technology, vol. 6(2), Apr. 1996.

(Continued)

*Primary Examiner* — Nhon Diep
(74) *Attorney, Agent, or Firm* — Baker Botts LLP

(57) ABSTRACT

Techniques for generating utility-based descriptors from compressed multimedia information are disclosed. A preferred method includes the steps of receiving least a segment of compressed multimedia information, determining two or more portions of utility based descriptor information based on one or more adaptation operations, each corresponding to a unique target rate, adapting the compressed multimedia segment by each the portions of utility based descriptor information to generate adapted multimedia segments, using a quality management method to generate measurement for each adapted multimedia segment, and generating a utility based descriptors based on the portions of utility based descriptor information and corresponding quality measurements.

19 Claims, 6 Drawing Sheets

U.S. PATENT DOCUMENTS 7,733,956 B1 * 6/2010 Kalra et al. ............... 375/240.1

OTHER PUBLICATIONS

Wang, et al. "Dynamic rate scaling of coded digital video for IVOD applications." Transactions on Consumer Electronics, vol. 44(3), Aug. 1998, pp. 743-749.

Wee, et al., "Field-to-frame transcoding with spatial and temporal downsampling." Proceedings of the 1999 International Conference on Image Processing, vol. 4, Oct. 1999.

Sorial, et al., "Selective requantization for transcoding of MPEG compressed video." Proceedings of the 2000 IEEE International Conference on Multimrdia and Expo, vol. 1, 2000, pp. 217-220.

Wee, et al., "Secure scalable video streaming for wireless networks." Proceedings of the 2001 IEEE International Conference on Acoustics, Speech, and Signal Process, vol. 4 of 6, May 2001, pp. 2049-2052.

Wee, et al., "Secure scalable streaming enabling transcoding without decryption." Proceedings of the 2001 International Conference on Image Processing, vol. 1 of 3, Oct. 2001.

Kim, et al., "Description of Utility function based on optimum transcoding" ISO/IEC JTC1/SC/ WG11 MPEG02/M8319, Apr. 2002.

Mukherjee, et al., "Structured scalble meta-formsats (SSM) for digital item adaptation" Proceedings of the SPIE, SPIE, Bellingham, VA, US, vol. 5018, Jan. 2003,, pp. 148-167.

U.S. Appl. No. 11/448,114, May 16, 2012 Notice of Appeal.

* cited by examiner

METHOD AND SYSTEM FOR OPTIMAL VIDEO TRANSCODING BASED ON UTILITY FUNCTION DESCRIPTORS

CROSS REFERENCE TO RELATED APPLICATION(S)

The present application is a continuation of International Patent Application No. PCT/US03/12858, filed Apr. 25, 2003, published on Nov. 6, 2003 as International Patent Publication No. WO 03/091850, which claims priority to U.S. Provisional Application Serial No. 60/376,129, filed on Apr. 26, 2002, and U. S. Provisional Patent Application Serial No. 60/384,939, filed on May 31, 2002, the contents of which hereby incorporated by reference in their entireties herein.

BACKGROUND OF THE INVENTION

1. Technical Field

The present invention relates to techniques for delivering multimedia content across a network, and more specifically, to techniques for transparently and adaptively transporting multimedia content across a wide range of networks.

2. Background Art

At the dawn of the 21st century, the Internet has achieved widespread use among businesses and consumers in the exchange of all forms of multimedia information. Graphic art, text, audio, video and other forms of information are continuously shared among users. In order to reduce bandwidth requirements to manageable levels, multimedia information is often stored and transported in the form of compressed bitstreams that are in a standard format. For example, in the case of audiovisual information, JPEG, Motion JPEG, MPEG-1, MPEG-2, MPEG-4, H.261 and H.263 are in widespread use.

Unfortunately, while a multitude of differing types of standardized multimedia content have been developed and made available on the Internet, there presently exists no standard way to control the access, delivery, management and protection for such content. Recognizing this need, the Motion Picture Experts Group ("MPEG") has recently commenced the MPEG-21 Multimedia Framework initiative in order to develop a solution. As further described in International Organisation for standardisation ("ISO") document ISO/IEC JTC1/SC29/WG11/N5231 (2002), one of the goals of MPEG-21 is develop a technique for delivering different types of content in an integrated and harmonized way, so that the content delivery process is entirely transparent to a wide spectrum of multimedia users.

In order to accomplish such a technique, part 7 of MPEG-7 proposes the concept of what is called "Digital Item Adaptation." That concept involves the adaptation of resources and descriptions that constitute a digital item to achieve interoperable transparent access to universal multimedia from any type of terminal and network. By implementing Digital Item Adaptation, users in a network would be unaware of network and terminal-specific issues that often affect the delivery of multimedia content, such as network congestion, quality limitations, and reliability of service. It is envisioned that a diverse community of users will therefor be able to share a multimedia experience, each to his or her individual acceptable level of quality.

Probably transcoding, which avoids the need to store content in different compressed formats for different network bandwidths and different terminals, is one of the most common methods of resource adaptation. In MPEG-7, so called Transcoding Hints have been proposed in order to enable better transcoding by reducing computation complexity while preserving quality as much as possible.

Unfortunately, the proposed MPEG-7 Transcoding Hints do not provide information about feasible transcoding operators and their expected performance in order to meet specific target rates. They likewise do not provide a solution that may be useful to fulfill the multiple requirements necessary to ensure a transparent, adaptive multimedia content delivery. Accordingly, there remains a need for a technique for delivering multiple types of multimedia content over a network to a wide spectrum of multimedia users having different acceptable levels of quality.

SUMMARY OF THE INVENTION

An object of the present invention is to provide a technique for delivering multiple types of multimedia content over a network to a wide spectrum of multimedia users having different acceptable levels of quality.

Another object of the present invention is to provide multimedia content description techniques that are useful to fulfill several requirements.

In order to meet these and other objects of the present invention, which will become apparent with reference to further disclosure set forth below, the present invention provides techniques for generating utility-based descriptors from compressed multimedia information. A preferred method includes the steps of receiving least a segment of compressed multimedia information, determining two or more portions of utility based descriptor information based on one or more adaptation operations, each corresponding to a unique target rate, adapting the compressed multimedia segment by each the portions of utility based descriptor information to generate adapted multimedia segments, using a quality management method to generate a quality measurement for each adapted multimedia segment, and generating a utility based descriptor based on the portions of utility based descriptor information and corresponding quality measurements.

In a preferred embodiment, the compressed multimedia information is MPEG-4 data, and from ten to twenty portions of utility based descriptor information are utilized. The portions of utility based descriptor information may be uniformly or non-uniformly sampled. Advantageously, the adaptation operations may include frame dropping, either by dropping first B frames or all B frames, and may further include coefficient dropping.

In another embodiment, the present invention provides systems and methods for delivering compressed multimedia information to two or more users, each having different target bit rates. In one arrangement, a method includes the steps of receiving at least a segment of compressed multimedia information and a corresponding utility based descriptor, parsing the utility based descriptor into portions, each corresponding to a unique target bit rate for each of the users, selecting a utility based descriptors portion that corresponds to the unique target bit rate for each user, and adapting the compressed multimedia segment by the selected utility based descriptors portion for each user. Target bit rate feedback information from the users, or from the network, may be utilized in the adaptation step.

The accompanying drawings, which are incorporated and constitute part of this disclosure, illustrate preferred embodiments of the invention and serve to explain the principles of the invention.

Figure 1:
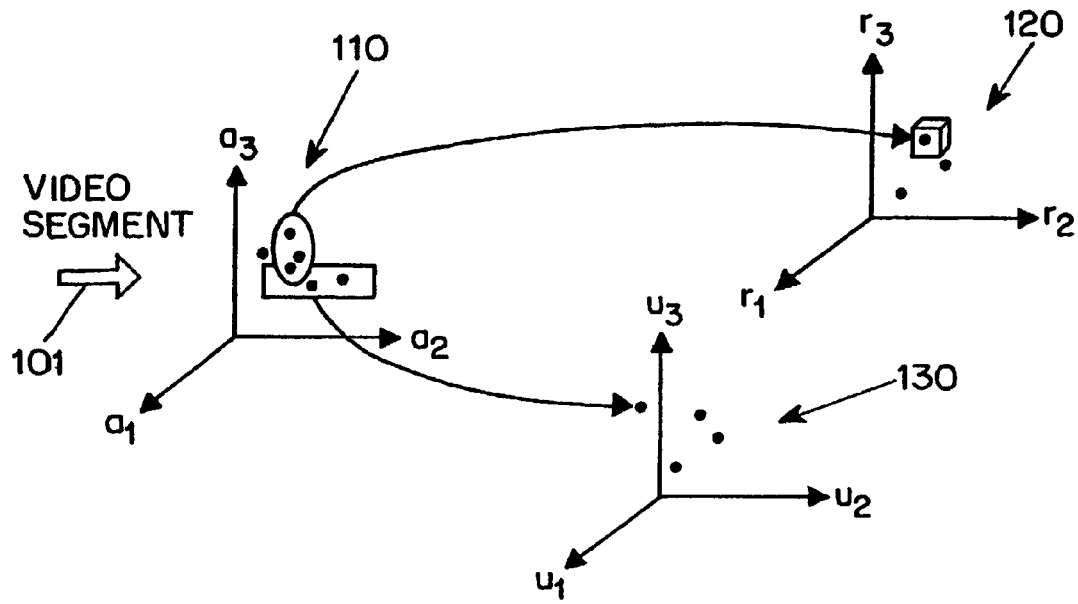
FIG. 1 is functional diagram showing the relationships among adaptation space, utility space, and resource space.

Throughout the Figs., the same reference numerals and characters, unless otherwise stated, are used to denote like features, elements, components or portions of the illustrated embodiments. Moreover, while the present invention will now be described in detail with reference to the Figs., it is done so in connection with the illustrative embodiments.

DETAILED DESCRIPTION OF THE PREFERRED EMBODIMENTS

Referring to FIG. 1, an exemplary embodiment of the present invention will be described. A utility-based framework provides a systematic way of efficient video adaptation by modeling the relationships among essential parameters: adaptation operations, resources, and utility. In general, adaptation operations can take the form of spatial domain adaptation, temporal adaptation, or object-based adaptation. Spatial domain adaptation may include spatial resolution reduction and quality or signal-to-noise adaptation, such as requantization or DCT coefficient dropping. Temporal domain adaptation may include frame dropping, and object-based adaptation may include video object prioritization and/or dropping. A particular operation defined by any of such adaptation methods is referred to herein as an adaptation operation.

Resources include available support from terminal devices and network capabilities like bandwidth, computation capability, power, and display size, etc. Utility includes the quality of content resulted from a particular adaptation operation. Utility can be measured in an objective manner, such as by determining the peak signal-to-noise ratio ("PSNR"), or a subjective one, e.g., by use of a subjective quality score. FIG. 1 illustrates the multi-dimensional space of adaptation, resources, and utility and the relations among them as applied to MPEG-4 compressed video.

The adaptation space 110 represents the conceptual space of all possible adaptation operations for one or more selected adaptation methods. Each dimension of the adaptation space represents one type of adaptation method and has a certain cardinal index representing associated adaptation operations. For example, where frame dropping and coefficient dropping are both utilized, there are two dimensions in the adaptation space: frame dropping and coefficient dropping. The dimension of frame dropping can be indexed by the amount of frames dropped, e.g., no dropping, all B frames dropped in a sub-Group of Pictures ("GOP") (a sub-GOP includes a set of successive frames beginning with an I or P frame and continuing to the next I or P frame), all B and P frames dropped in each GOP. The coefficient dropping dimension can be indexed by the percentage of rate-reduction to be achieved by coefficient dropping, e.g., no dropping, 10%, 20%, etc. In this way, a set of discrete points in the adaptation space can be defined, each point representing an adaptation operation specified by a particular combination of frame dropping and coefficient dropping.

In some applications, the resource limitation may include several types of resources. For example, in order to provide video-streaming service to certain handheld devices, factors such as spatial resolution or computational capability should also be taken into account along with bandwidth. In general, all types of resources to be satisfied are represented by a multi-dimensional resource space. Utility space may include attributes in multiple dimensions. In addition to PSNR, the subjective preference like mean opinion scale ("MOS"), temporal smoothness may be included in other dimensions together.

Referring again to FIG. 1, a video segment 101 is a unit undergoing adaptation, with each point representing a particular adaptation operation in the adaptation space. The adapted video segment has the resulting values of resources and utilities represented as corresponding points in the resource and utility spaces, respectively. The shaded cube in the resource space represents the resource constraints specified by applications. Note that there may exist multiple adaptation operations that satisfy the same resource requirement. The oval shaped region in the adaptation space that is mapped into a point in the resource space shows such a constant-resource set. Also, different adaptation operators may result in the same utility value. The rectangular region in the adaptation space represents such a constant-utility set.

Using the utility-based framework, video adaptation can be formulated as follows: given certain resource constraints, determine the optimal adaptation operation so that the utility of the adapted video is maximized. Since most adaptation problems likely to be assumed in the UMA paradigm can be formulated so formulated, such resource-constrained utility maximization may be considered to be a basic scenario of multimedia adaptation. While the disclosure herein is directed to optimizing a frame and coefficient dropping transcoding to satisfy available bandwidth as an example of resource-constrained utility maximization, those skilled in the art should appreciate that the utility-based framework of the present invention can readily include constraints in the utility space and aim at overall resource minimization.

Figure 2:
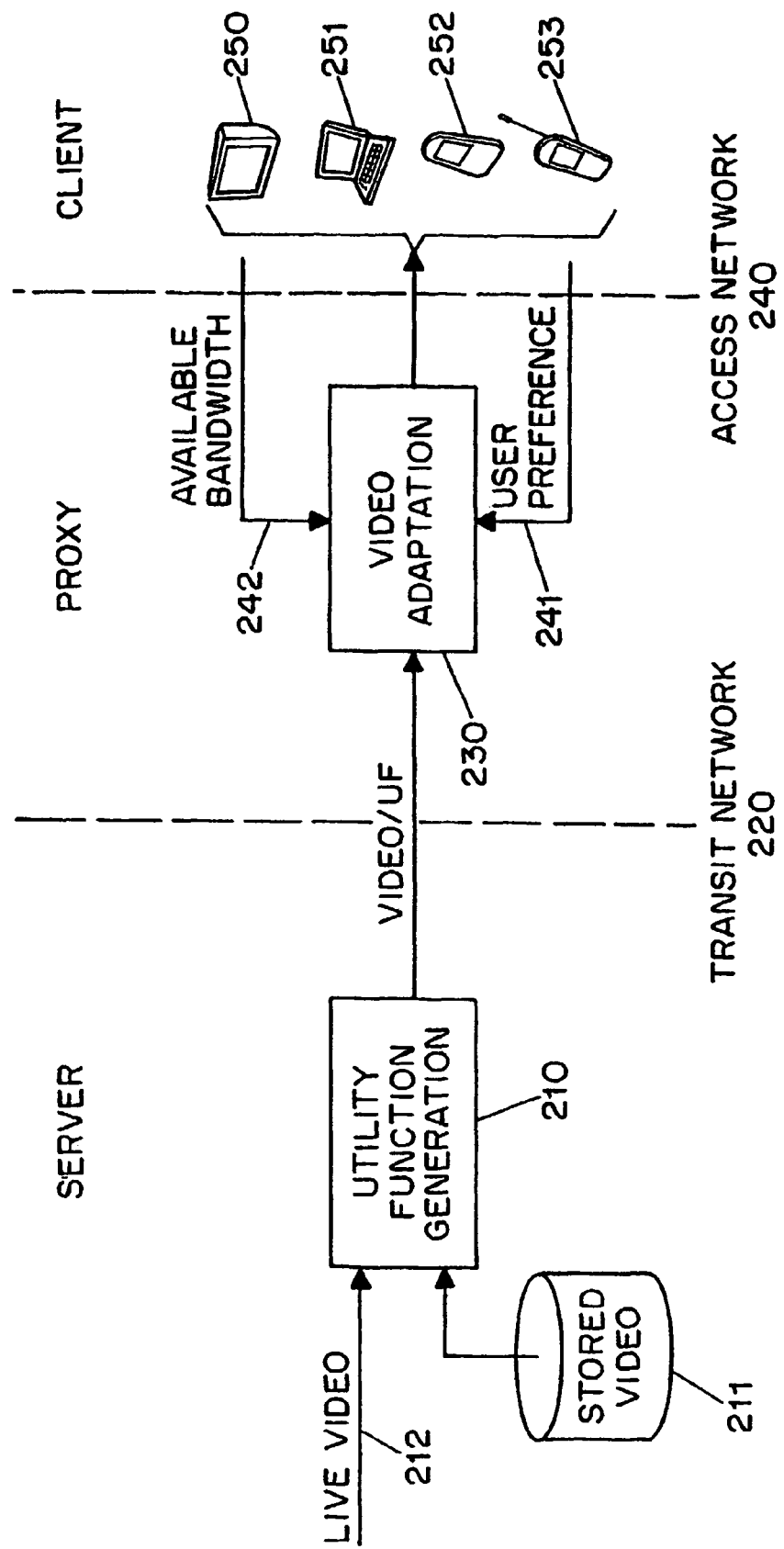
FIG. 2 is a block diagram of an exemplary system in accordance with the present invention.

Referring next to FIG. 2 a system in accordance with the present invention will now be described. A server computer 210 is adapted to receive stored video 211 and/or live video 212. That video is preferably in a compressed format, such as MPEG-1, MPEG-2, or MPEG-4, although uncompressed digital video could be provided to the server, with compression occurring thereon. The server 210 includes software written in any available programming language for generating a utility function, in the form of utility-based descriptors, based on the received video. In accordance with the present invention and described in further detail below, that descriptors is indicative of certain modifications to the compressed video, e.g., through the elimination of bidirectionally-predictive ("B") frames or coefficients, that will result in predetermined levels of quality. The compressed domain video and associated utility function are delivered over a transit network 220, such as the Internet or an intranet of sufficient bandwidth to transmit the compressed video. The transmitted information is received by a network computer 230, which in turn serves as the video adaptation engine of the system.

In particular, the network computer 230 includes software, again written in any available programming language, to adapt the incoming compressed video to the particular bandwidth requirements of several client devices 250, 251, 252, 253 that are served by associated access networks 240. In accordance with the present invention and described in further detail below, the network computer 230 uses the utility-based descriptors generated by the server 210 to adapt the compressed video to such bandwidth requirements. Further, the network computer 230 may receive preference information 241 from the client users, and/or available bandwidth information 242 from the network, in order to optimize its adaptation operation.

The access network 240 may be the Internet, an intranet, or a proprietary network such as a wireless network that links mobile cellular user terminals 253 to the network computer 230. In the application of video streaming over bandwidth-limited network, the bit rate of a video stream to be delivered is adapted to time-varying bandwidth by an adaptation tool in real-time.

In a preferred arrangement, a combination of frame dropping and coefficient dropping are used by the server computer 210 for the adaptation of nonscalable video to dynamic bandwidth. However, those skilled in the art should appreciate that other transcoding techniques could be utilized to adjust the bit-rate of video streams for dynamic bandwidth adaptation, such as re-encoding, re-quantization of DCT coefficients, object-based transcoding, and image-size reduction. The Fine-Granular-Scalability ("FGS") and some of its variant forms that have been adopted as new scalable coding tools in MPEG-4 also enable the dynamic adaptation of a FGS-stream to time-varying bandwidth by selecting appropriate number of bitplanes of scalable streams.

Frame and coefficient dropping are simple ways of rate adaptation with low computational complexity since they involve the truncation of portions of a bit sequence corresponding to particular frames and symbols of DCT coefficients to be dropped by a compressed-domain processing. Further, for the application of video streaming over mobile wireless networks, they are more suitable for low delay real-time operation that is strongly required in a transcoding proxy.

Moreover, the combination of frame and coefficient dropping enables the adaptation of the rate of a video stream by adjusting spatial and temporal qualities: frame dropping adjusts frame rate by dropping some frames, and coefficient dropping adjusts spatial quality by dropping some of DCT coefficients that are associated with higher frequency components. The dynamic range of rate reduction is increased by combining two or more transcoding methods.

Frame dropping will next be descried. Frame dropping is a typical kind of temporal transcoding that adjusts frame rate by dropping some frames from an incoming video stream. It is often used for rate adaptation to bandwidth variations in video streaming applications because of its efficiency and simplicity. One factor should be considered is the selection of the frames to be dropped. For example, when an intra-coded frame (an "I frame") or certain predectivly coded frames (a "P" frame) are dropped, frames that refer to the dropped frame need to be re-encoded.

Thus, it is preferred that only B frames and/or P frames that do not have a decoding dependency are dropped, in the unit a group of pictures ("GOP"), by taking into account the sequence structure of an incoming video stream. Frame dropping provides only a coarse approximation to the target rate since the smallest unit of data that can be removed is an entire frame. Therefore, the possible frame dropping operations are defined by specifying the frame type to be dropped rather than the reduction rate to be achieved by the dropping.

For a GOP having the sub-group of 3 pictures between anchor frames (M=3), a set of frame dropping operations depending on an assumed GOP structure may be defined as follows: no frame dropping, one B frame dropped in each sub-GOP, all B frames dropped, and all B and P frames dropped, resulting in an I frame only sequence. For a GOP having a sub-group of one I picture between two successive anchor frames (M=1), it is assumed that P frames are dropped from the end of each GOP, such as the last P frame dropped, the two last P frames dropped, etc. through all P frames dropped in each GOP.

Although the selection of the frames to be dropped frame is limited, this approach may be sufficient enough in terms of the amount of the bit rate reduction and quality alone, or may be combined with coefficient dropping (to be discussed below) in order to balance the desired temporal adaptation of frame dropping with the spatial adaptation of coefficient dropping. It should be noted that dropping frames may cause frame jerkiness since the dropped frames usually are replaced by previous frames. In the first case of GOP structure that has more than one picture between anchor frames (M>1), the defined transcoding operations evenly distribute the dropped frames in the temporal range results in more comfortable temporal quality. On the other hand, a special dynamic player is needed that can adjust the presentation time for each decoded frame from the transcoded stream in the case of GOP with (M=1) to reduce annoying effect cause by non-uniform frame dropping within a GOP.

Coefficient dropping will next be described. There are two fundamental ways in spatial adaptation that perform operations in the frequency domain on DCI coefficients. The first is requantization, i.e., the modification of quantized coefficients by employing coarser quantization levels to reduce bit rate. The second is coefficient dropping in which higher frequency coefficients which are less important for image quality are truncated. Coefficient dropping is preferred since it is more amenable to fast processing than requantization, which requires the implementation of recoding-type algorithms.

More specifically, assuming that a set of DCI coefficient run-length codes at the end of each block is eliminated, the number of DCI coefficient codes within each block that will be kept after truncation is called breakpoint. The breakpoint for each block may be determined using Lagrangian optimization, which minimizes the distortion caused by the coefficient dropping while meeting the required target rate in a frame-by-frame basis. In the rate-distortion formulation of the optimization, an algorithm which does not require memory can be employed, with such an algorithm ignoring accumulated errors caused by motion compensation and treating each picture as an intra-coded one due to its simplicity. Ignoring the accumulated errors does not much affect the quality and allows achieving essentially optimal (within 0.3 dB) performance.

In a given video segment and the target rate, we first assume uniform dropping that gives uniform rate reduction across different frames. Then, within a single frame, we perform the above optimal non-uniform dropping that gives different rate reductions with different breakpoints among blocks, while meeting the target rate of the given frame.

Unlike frame dropping, in which the reducible rates are limited to several values since the smallest unit of data which can be removed is an entire frame, coefficient dropping provides the ability to meet and available bandwidth quite accurately within the upper bound of rate reduction by adjusting the amount of dropped coefficients. Preferably, only AC DCT coefficients are dropped in order to avoid somewhat complicated syntax changes that caused by when all coefficients are dropped, and to ensure a minimum necessary quality. The upper bound of rate reduction depends on an incoming video stream. Numerous coefficient-dropping operations may be defined by specifying the percentage of rate reduction to be achieved, rather than directly specifying the dropped coefficients themselves. For example, the operation of coefficient dropping (10%) represents a 10% reduction of the bit rate of incoming video stream by coefficient dropping.

The combination of frame and coefficient dropping is next described. For higher bit rate reduction, frame dropping or coefficient dropping alone may not be sufficient to accommodate available bandwidth. Moreover, only a few discrete points can be achievable by frame dropping, while a continuous rate adaptation is possible by using coefficient dropping. Therefore, the combination of frame dropping and coefficient dropping enables the extension of dynamic range of the reducible rate. The combination of both may also yield better perceptual quality than either technique alone, especially for large rate reductions, by optimizing the trade-off between spatial and temporal quality. For example, in order to reduce frame jerkiness at very low frame rates, temporal resolution can be traded with the spatial quality while meeting the same rate reduction.

Figure 3:
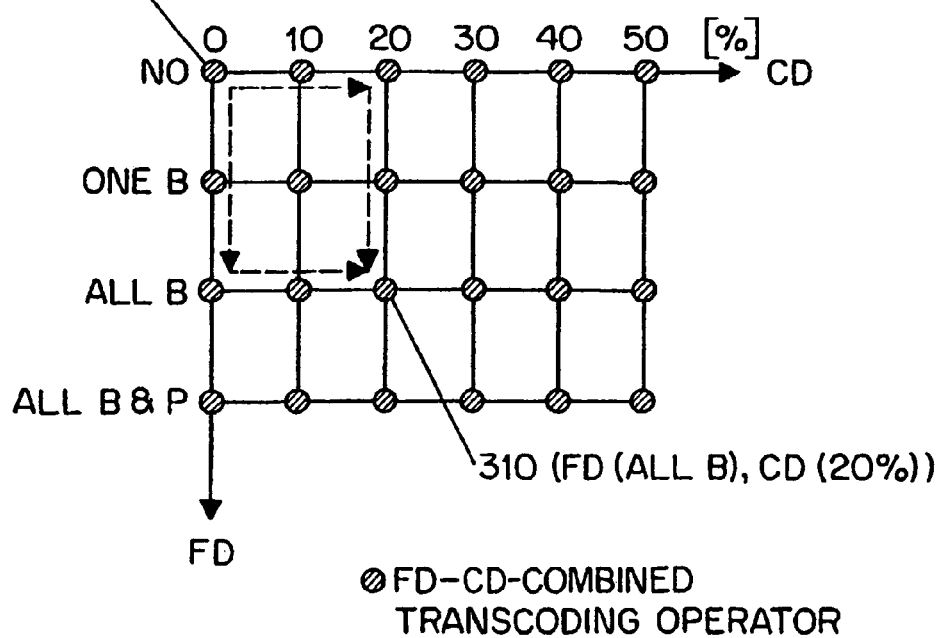
FIG. 3 is an illustrative diagram showing a two dimensional adaptation space defined by a combination of frame dropping and coefficient dropping.

Referring next to FIG. 3, a two-dimensional adaptation space defined by the combination of frame dropping and coefficient dropping is shown. Each point represents a frame dropping/coefficient dropping-combined transcoding operation. Note that the effect of the order of operations should be considered in the combination of coefficient and frame dropping. For example, there are two combinations having different orders of operation to achieve the same point 310: either 20% coefficient dropping followed by B frame dropping, or B frame dropping followed by 20% coefficient dropping. The results of both cases are the same if rate-based uniform coefficient dropping in which the same rate-reduction is applied across the frames is employed. However, in the case that different reduction ratios are assigned among frames to achieve global optimum coefficient dropping based on rate allocation, different operation orders may result in different results of reduced rate and quality. While the present disclosure is directed to the former, the present invention contemplates both scenarios.

The generation of a utility function will next be described. In general the relationships among the adaptation space, resource space, and utility space shown in FIG. 1 can be modeled based on a utility function. A utility function may be defined as a media quality metric representing a user satisfaction index as a function of resources. In the context of the present invention, the adaptation space is a two-dimensional space specifying combinations of frame dropping and coefficient dropping, the resource space includes the available bandwidth varied with time, and the utility space includes the signal to noise measure of the transcoded video stream.

Figure 4:
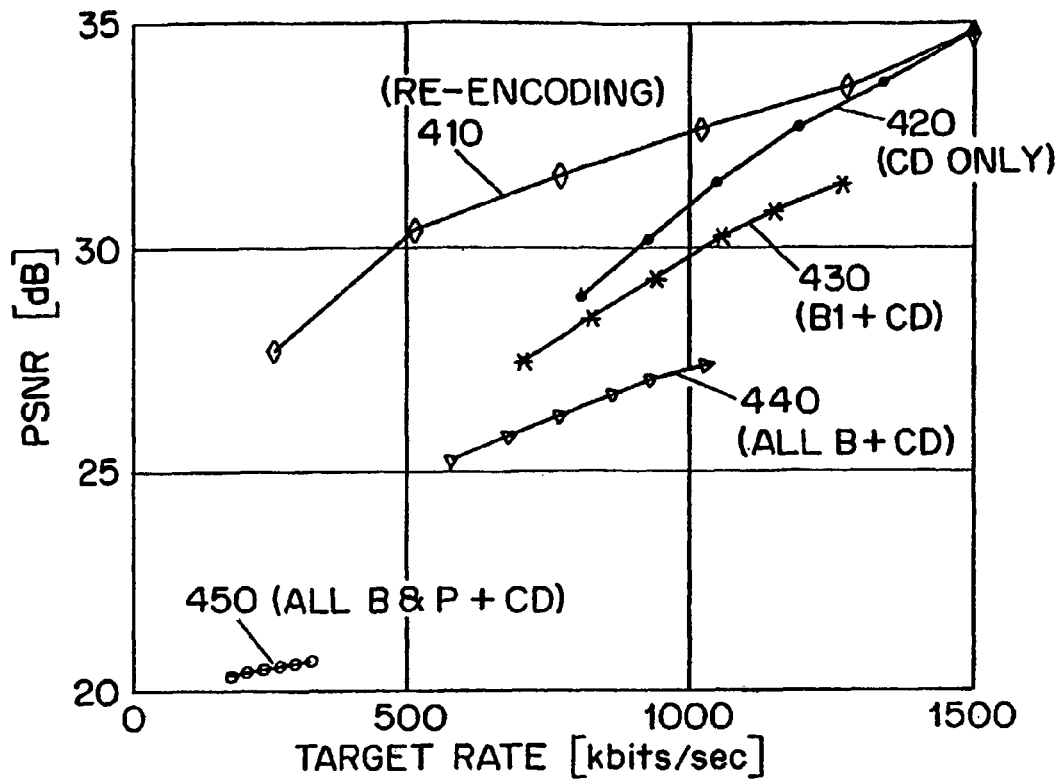
FIG. 4 is a graph showing an exemplary utility function in accordance with the present invention.

Referring next to FIG. 4, an exemplary utility function generated by a combined frame dropping/coefficient dropping transcoding method applied to previously stored MPEG-4 compressed video data, "coastguard" coded at 1.5 Mbps and adapted over a bandwidth range less than 200 kbps, is shown. FIG. 4 is a graph plotting target rate in kbits/sec against PSNR, and illustrates four curves 420, 420, 430, 440 that represent the relationship between the target rates and PSNR qualities, each for a different adaptation operation within the exemplary utility function.

In the example, four different frame dropping operations and six types of coefficient dropping operations are utilized. The frame dropping operations consist of no frames dropped, one B-frame dropped in each sub-GOP, all B-frames dropped, and all B- and P-frames dropped. The six coefficient dropping operation are set at 0%, 10%, 20%, 30%, 40%, and 50% reduction of the bit rate of the original test video stream. In this way, there are 23 combined operations, which employ different combinations of the defined frame dropping and coefficient dropping operations. Those 23 operations are shown as discrete points in curves 420, 430, 440, and 450, which illustrate the set of points for the various coefficient dropping operations when no frames are dropped 420, one B-frame dropped 430, all B-frames are dropped 440, and all B- and P-frames are dropped 450, respectively.

FIG. 4, also illustrates a re-encoding curve 410, obtained by a cascaded full-decoding and re-encoding, and thus may be considered as a reference for performance comparison of the transcoding operations. It is important to note that for a given target bandwidth, there are multiple adaptation operations satisfying the same target rate. The optimal operation with the highest video utility is selected.

As shown in FIG. 4, the utility function depends on the type of video content, the chosen coding parameters of an incoming video stream, and the applied transcoding method. Given video segments which share the same content type and transcoding method, the generation of a utility function requires the repetitive computation of PSNR quality and rate for a family of defined adaptation operations by testing all possible operations.

Utility function generation for live video will next be described. For previously recorded video, the utility function can be generated by off-line processing in a server in which computational cost is not a concern, such as in the case of FIG. 4. However, this option is generally not an acceptable solution for live video, given the need for such extensive repetitive computation. Accordingly, a content-based utility prediction solution may be used to predict a utility function in the case of live video.

In general, video can be mapped to distinctive utility distribution classes prepared in advance based on computable content features, such as motion activity and spatial activity extracted from compressed streams. Accordingly, a utility function corresponding to an expected incoming stream of video is prepared in advance for live video.

Forming a prediction for a live utility function is a two step process. First, an adaptive content classification loop is employed; second, a real-time estimation path is utilized. A set of utility functions that can cover entire types of content are generated and classified in the adaptive content classification loop off-line. Later, when a live video stream is received, the real-time estimation path selects an associated utility function for each video segment in order to preserve the same content type in real-time.

The description of utility functions will next be described. In the utility-based framework, the utility function that represents distributions of the adaptation, resource, and utility spaces, as well as the relationships among them, are delivered along with an associated video stream to an adaptation engine, e.g., located on network computer 230. The main goal of the descriptor is to describe the distributions of the three spaces (adaptation, resource, and utility) and the relationships among them to support various types of usage scenarios in an efficient way. The descriptor should provide sufficient information to the adaptation engine as to what are possible adaptation operations satisfying constrained resources and the associated utilities.

In order to describe a utility function such as the of FIG. 4, the range of bit rates are sampled into a finite set of points, and then all feasible frame dropping-coefficient dropping-combined operations capable of achieving the resource and the associated values of PSNR are described using the sampled resource points as indexes. In general, a finite set of points over the multi-dimensional resource space is defined as indexes in the description.

Linear or non-linear sampling of the resource space can be selected depending on the characteristics of distributions of adaptation space by taking into account the efficiency of description as well as the number of sampling points. Interpolation between two consecutive points of resource and corresponding adaptation operations and utilities may also occur in a linear or non-linear manner. In the case of adaptation, however, it should be noted that interpolation is not feasible between different frame dropping operations unlike coefficient dropping.

By specifying a particular adaptation method, a constrained resource, and utility according to intended applications, the descriptor can support most cases of resource-constrained scenarios.

Some adaptation operations may not be uniquely defined in terms of quality. For example, an operation of "10% reduction of bit rate by dropping DCT coefficients in each frame (represented as coefficient dropping (10%))" does not specify the exact set of coefficients to be dropped. Different implementations may choose different sets and result in slightly different utility values. As a result, the value of utility associated to a particular operation is not reliable.

On the other hand, some adaptation methods do not cause the ambiguity issue due to their unambiguous representation formats in terms of adaptation. For example, some scalable compression formats, such as JPEG-2000 and MPEG-4 FGS, provide unambiguously defined scalable layers. Subsets of the layers can be truncated in a consistent way with the same resulted quality as long as the decoders are compliant with the standards.

Quality ranking may be employed in order to address this ambiguity issue. In some applications, the absolute values of utility of each adapted media are not important, but instead, the relative ranking of such values among different adaptation operations satisfying the same resource may be critical. In such cases, the likelihood of achieving ranking consistence is higher than absolute value consistence. In this sense, the descriptor describe the ranking instead of the utility value to provide the notion of quality even the case that the quality values are not reliable due to the ambiguity. In addition, the descriptors may include a flag to represent whether or not the ranking is consistent over different implementations. Assuming there exists some consistence among practical implementations, the empirical value of the flag may be obtained.

Figure 5A:
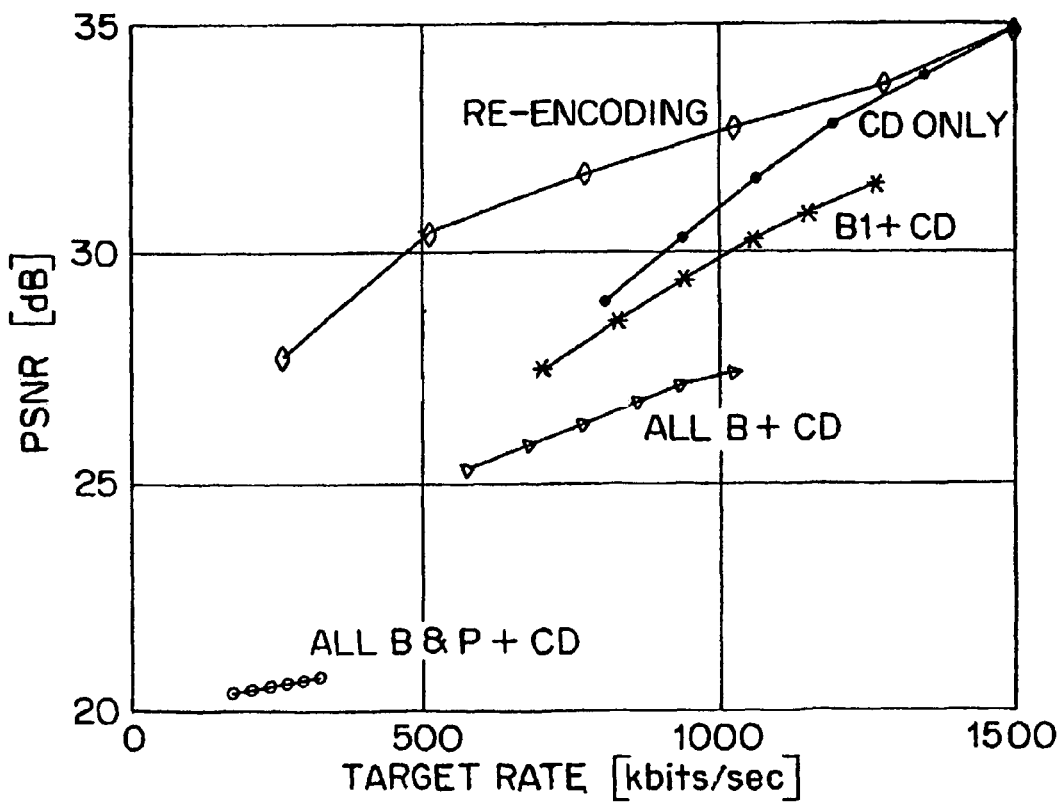
FIGS. 5(a)-(c) are graphs showing variations of the exemplary utility function shown in FIG. 4.
Figure 5B:
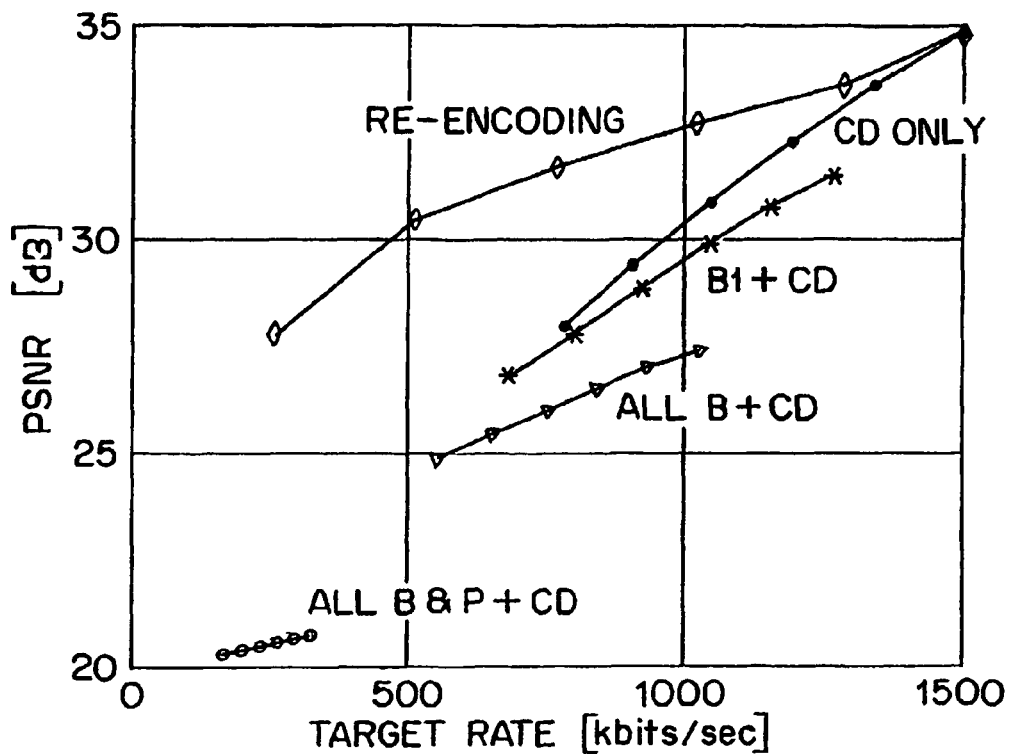
Figure 5C:
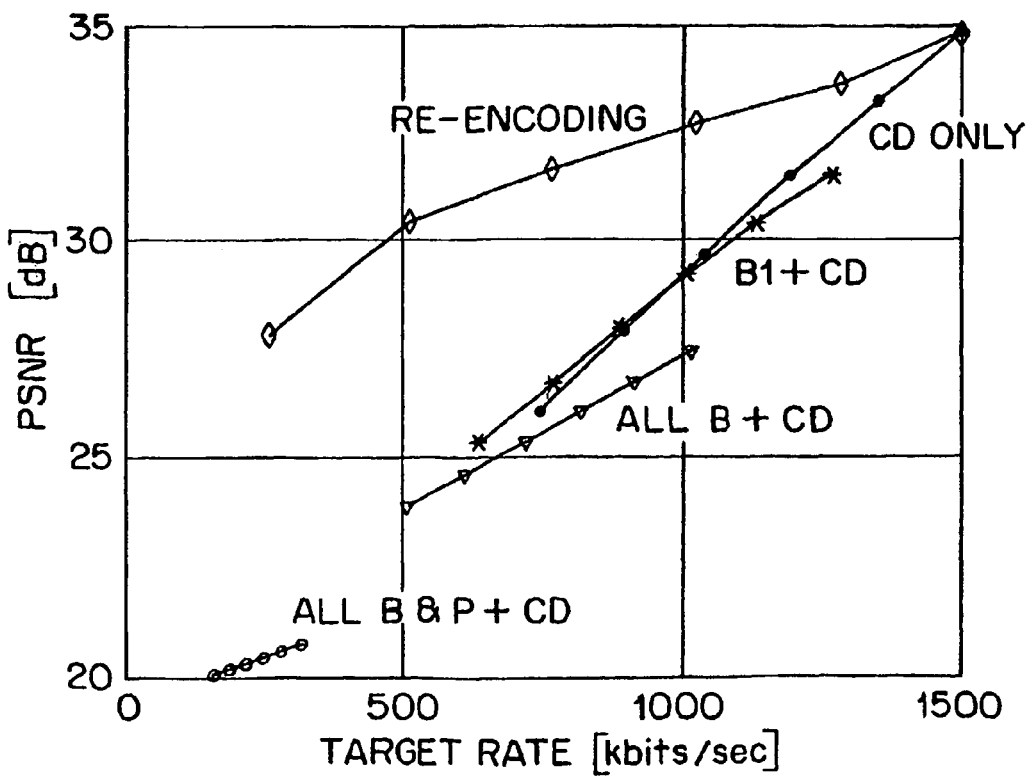

Referring next to FIGS. 5(a)-(c), the variation of utility functions resulting from different implementations of coefficient dropping to obtain the value of the consistency flag is shown. FIG. 5(a) is a reproduction of FIG. 4; FIG. 5(b) shows the same curves applied to the same data, except that macroblock optimizing is selected; and FIG. 5(c) again shows the same curves applied to the same data, except with pure rate-based uniform coefficient dropping is used, without optimization across blocks.

As shown in FIGS. 5(a)-(c), there are noticeable variations of utility values among utility functions with different implementations. There may be several operations with different qualities achieving the same bit rate. In some parts of the bit rate range excepting the range covered by shaded box in FIG. 5 (c), the rank of such equal-rate operations in terms of quality is consistent among different implementations. Even in the shaded box, there is constancy of rank depending on operations. Namely, the operation of all B frame coefficient dropping and coefficient dropping has the worst utility regardless of implementations. Based on this observation, the descriptor describes the rank and the optional flag for each operator to represent the consistency of the rank fully.

Figure 6:
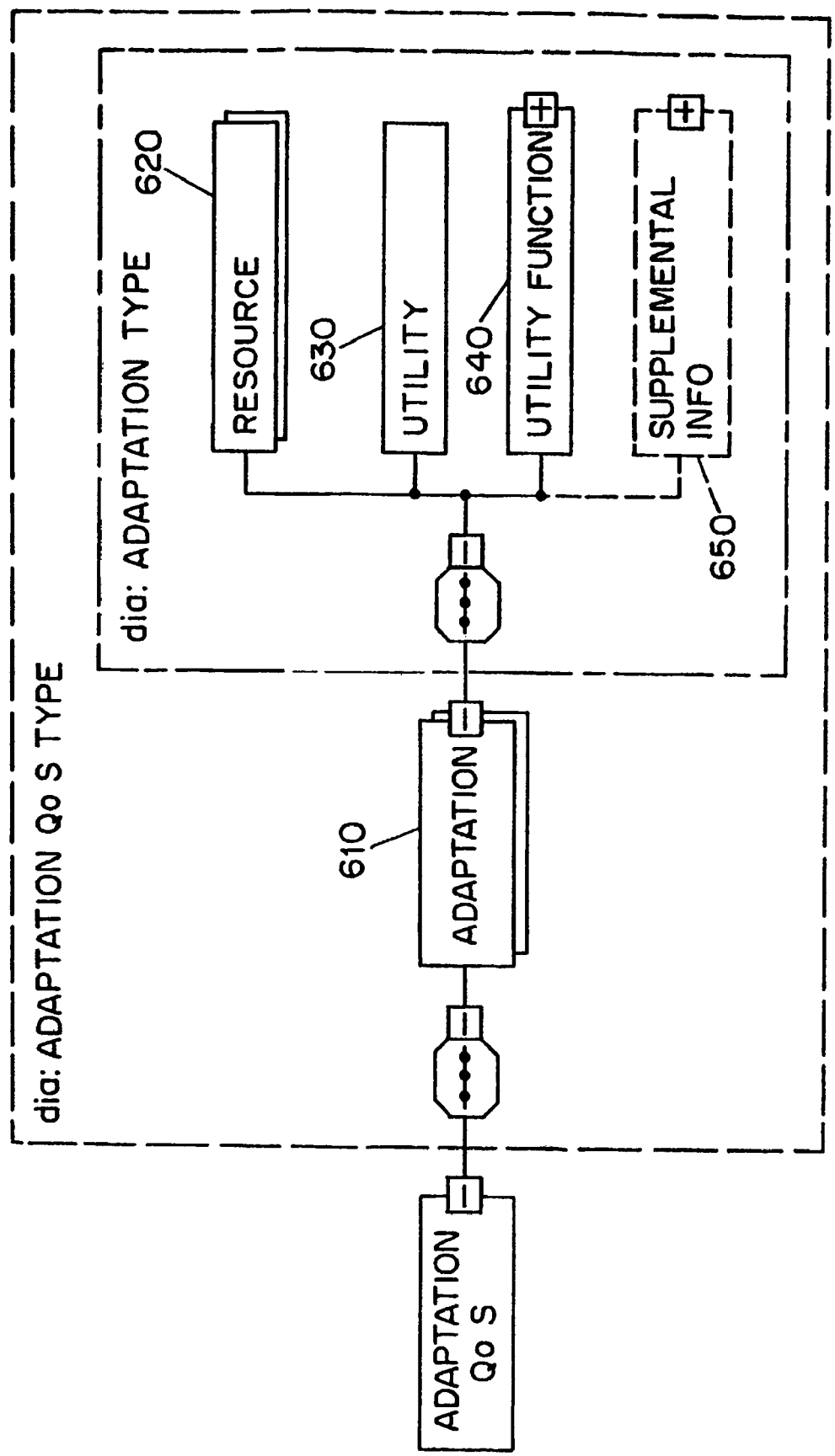
FIG. 6 is a schematic diagram of an exemplary utility based description tool in accordance with the present invention.

Referring next to FIG. 6, an exemplary utility-based descriptor is shown. The descriptor provides a set of adaptation descriptors 610, each of which describes a utility function associated with an adaptation method by including elements of resource, utility, and utility function. The descriptor enables the selection of a defined adaptation method according to the intended scenario by specifying one of the enumerated ones by an attribute; such as combined frame and coefficient dropping.

The Resource 620 and Utility 630 descriptors define constrained resource and utility associated to the utility function 640 to be described in terms of name and unit, respectively. Especially, multiple instantiations of the Resource field 620 are allowed to accommodate the multi dimensional resource space. The UtilityFunction descriptor 640 represents a set of possible adaptation operators and associated utilities as function of resource points.

Figure 7:
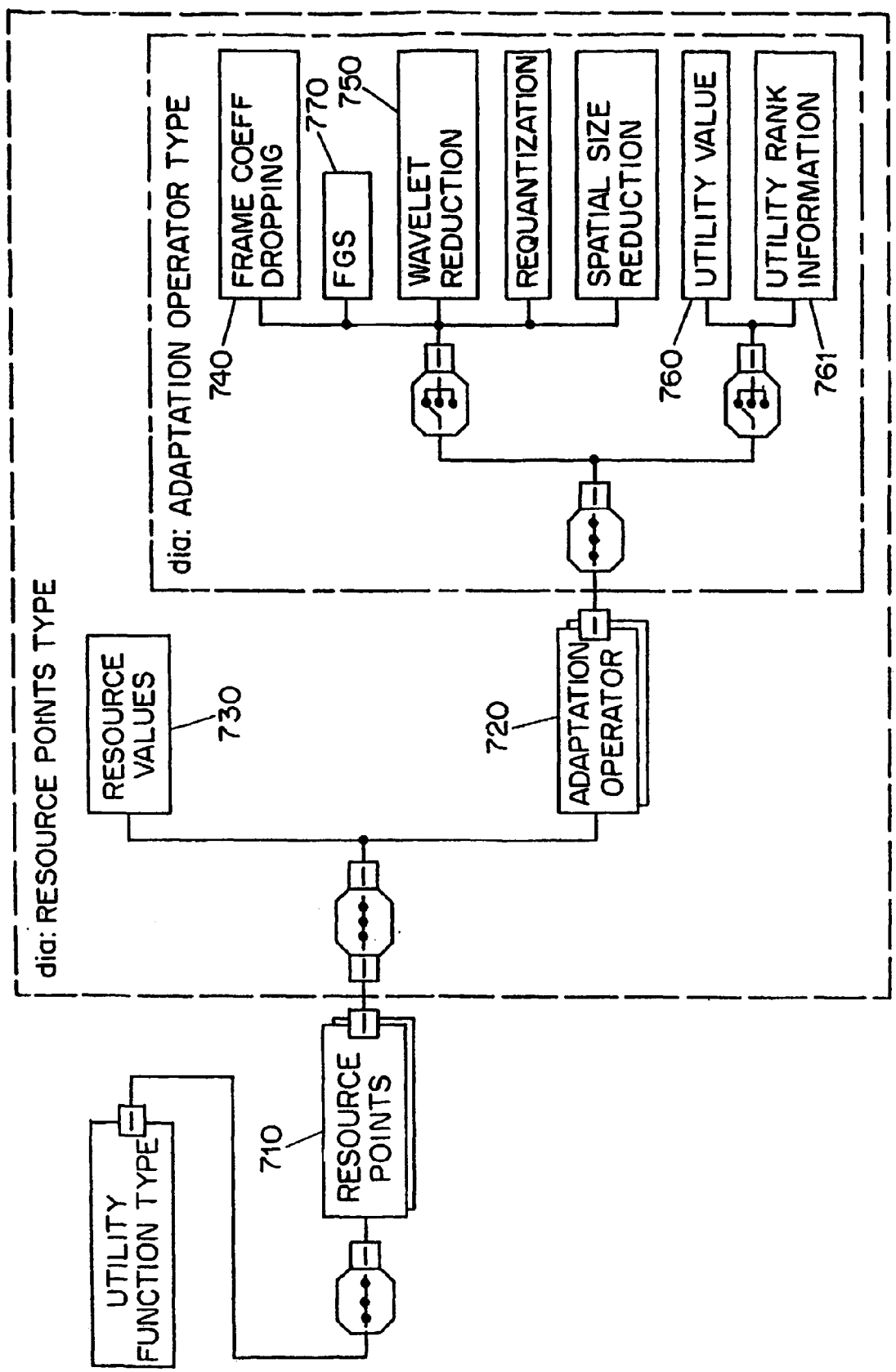
FIG. 7 is a schematic diagram of an exemplary utility-based descriptor in accordance with the present invention.

Referring next to FIG. 7, an exemplary UtilityFunction descriptor 640 is shown. The UtilityFunction descriptor 640 includes a set of ResourcePoints 710, each of which includes a set of AdaptationOperators 720 to describe all possible adaptation operations satisfying the sampled values of constrained resources that are described by ResourceValues 730. A particular adaptation operation of the specific adaptation method is described by selecting corresponding element. For example, FrameCoeffDropping 740 may be used for describing a particular operation of frame dropping/coefficient dropping-combined transcoding by specifying the type and number of frame to be dropped and the percentage of bit rate to be reduced by truncating coefficients. As noted above, other operations may be used, such as WaveletReduction 750 in order to describe the specific operation of wavelet reduction by specifying the number of levels and bitplanes to be truncated. The adaptation operator FGS 770 may be used to describe the specific operation of an MPEG-4 Fine Granularity Scalability ("FGS") stream by specifying the number of bitplanes of FGS-frames, and/or the number of bitplanes of FGST-frames to be truncated from the enhancement layer.

In addition to adaptation operation, the associated utility value is described by the UtilityValue 760. Where adaptation method is subject to ambiguity in specifying the adaptation operation, the UtilityRankInformation 761 is instantiated instead of the UtilityValue to describe the rank of the associated operation with an optional attribute of a consistency Flag representing the consistence of the rank.

The foregoing merely illustrates the principles of the invention. Various modifications and alterations to the described embodiments will be apparent to those skilled in the art in view of the teachings herein. It will thus be appreciated that those skilled in the art will be able to devise numerous systems and methods which, although not explicitly shown or described herein, embody the principles of the invention and are thus within the spirit and scope of the invention.

The invention claimed is:

1. A method for delivering compressed multimedia information to one or more users, each having one or more resource constraints, comprising the steps of:
   (a) receiving at least a segment of said compressed multimedia information and a corresponding utility based descriptor;
   (b) parsing said utility based descriptor into two or more portions of descriptor information, each portion corresponding to a different one or more resource constraints;
   (c) for each of said one or more users, selecting one of said two or more utility based descriptor information portions, if any, which corresponds to said resource constraints for said user;

(d) for each of said one or more users, adapting said received compressed multimedia segment by said selected utility based descriptor information portion; and (e) interpolating, for each of said one or more users for which one of said two or more utility based descriptor information portions were not selected in step (c), between two consecutive utility based descriptor information portions from said two or more utility based descriptor information portions to generate an interpolated utility based descriptor which approximately corresponds to said resource constraints for said user.

2. The method of claim 1, wherein said compressed multimedia information comprises MPEG-4 data.

3. The method of claim 1, wherein said compressed multimedia information comprises MPEG-2 data.

4. The method of claim 1, wherein said compressed multimedia information comprises MPEG-1 data.

5. The method of claim 1, wherein said resource constraints comprise target rate information.

6. The method of claim 1, wherein said parsing step comprises parsing said received utility based descriptor into five to one hundred portions, each portion corresponding to a unique set of one or more resource constraints.

7. The method of claim 1, wherein said portions of utility based descriptor information are uniformly sampled.

8. The method of claim 1, wherein said portions of utility based descriptor information are non-uniformly sampled.

9. The method of claim 1, wherein said adaptation step includes dropping frames.

10. The method of claim 9, wherein said frames comprise first B frames in each sub group of pictures of said received segment.

11. The method of claim 9, wherein said frames comprise all B frames in each group of pictures of said received segment.

12. The method of claim 9, wherein said frames include a P frame at an end of each group of pictures of said received segment.

13. The method of claim 1, wherein said adaptation step further includes DCT coefficient dropping.

14. The method of claim 1, wherein said adaptation step further includes truncation of an MPEG-4 Fine Granularity Scalability stream.

15. The method of claim 1, wherein said resource constraints comprise target rate information, and further comprising the step of receiving user preference information from at least one of said one or more users, and wherein said adaptation step further includes using said user preference information for said corresponding user.

16. The method of claim 1, wherein said resource constraints comprise target rate information, and further comprising the step of receiving target bit rate feedback from a network corresponding to at least one of said one or more users, and wherein said adaptation step further includes using said feedback for said corresponding user.

17. The method of claim 1, and wherein said adaptation step further includes using a predetermined network bandwidth parameter for adapting said received compressed multimedia segment.

18. The method of claim 1, wherein said compressed multimedia information comprises stored video information.

19. The method of claim 1, wherein said compressed multimedia information comprises live video information.

* * * * *